UNITED STATES PATENT OFFICE.

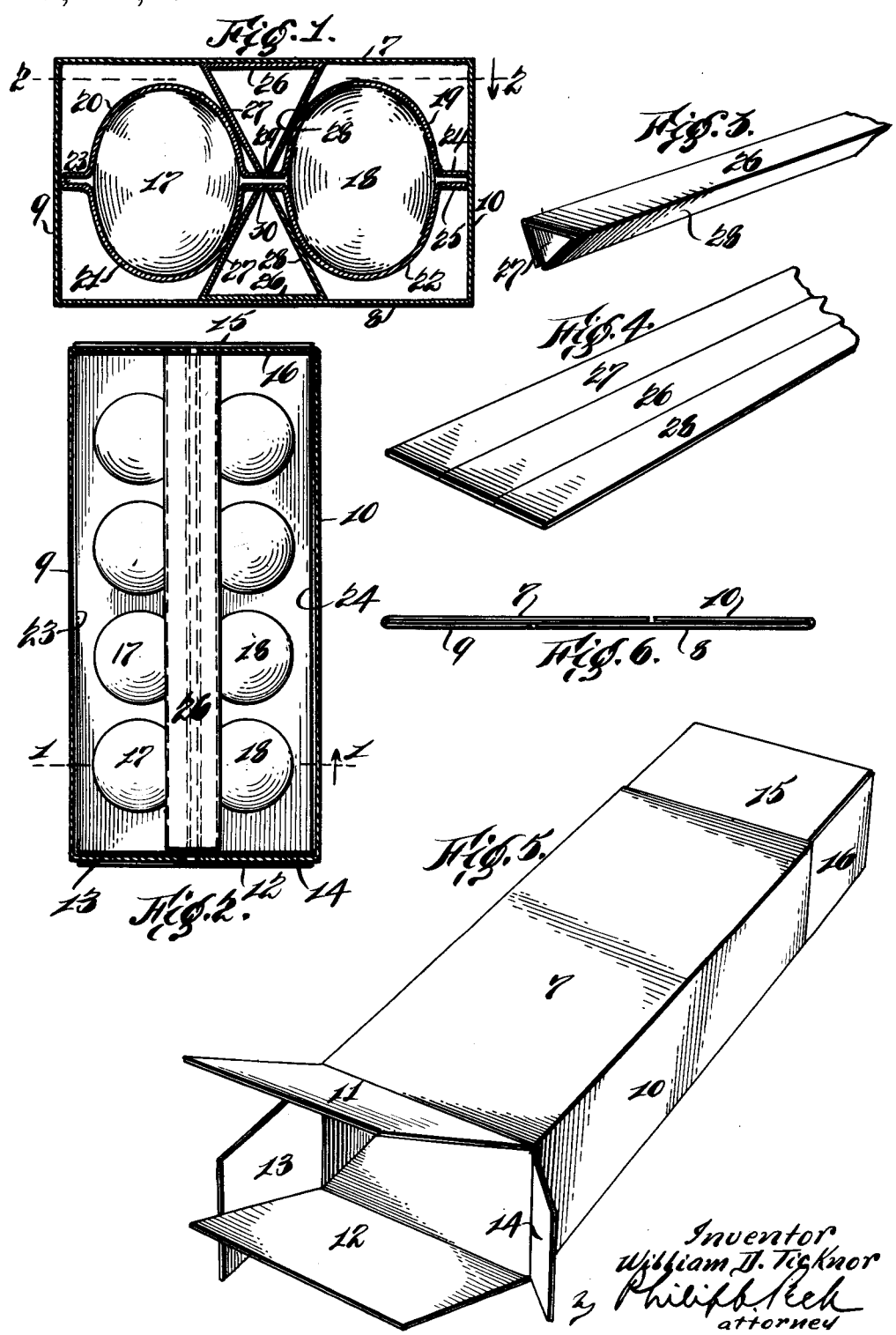

WILLIAM D. TICKNOR, OF CANTON, MASSACHUSETTS, ASSIGNOR TO BOX COMPANY OF AMERICA, OF NEW YORK, N. Y., A CORPORATION OF NEW YORK.

EGG-CARRIER.

1,155,972.   Specification of Letters Patent.   Patented Oct. 5, 1915.

Application filed August 4, 1915. Serial No. 43,508.

*To all whom it may concern:*

Be it known that I, WILLIAM D. TICKNOR, a citizen of the United States, and a resident of the town of Canton, county of Norfolk, and State of Massachusetts, have invented a new and Improved Egg-Carrier, of which the following is a full, clear, and exact description.

The invention relates to that class of egg-carriers which are constructed of strawboard, cardboard or like material, and built so as to be shipped to the consumer in a flat or knock-down condition.

The objects of my invention, among other things, are to provide a simplified, yet strong and efficient, carrier construction, which shall, under all conditions of egg transportation, hold the individual eggs or other similar fragile articles not only securely and firmly in their predetermined positions, but also to prevent the unavoidable jars or concussions to the carrier proper from in any way injuring or breaking the eggs, during shipment.

The invention consists of novel features and parts and combinations of the same, which will be hereinafter more fully described, and then particularly pointed out in the claims.

A practical embodiment of my invention is represented in the accompanying drawings forming a part of this specification, in which similar numerals indicate similar parts throughout the several figures.

Figure 1 is a cross-sectional view of my improved carrier taken in the line 1—1 shown in Fig. 2; Fig. 2 is a sectional plan view taken in the line 2—2 in Fig. 1, the egg-carrier being shown in plan; Fig. 3 is a fragmentary detail perspective view of one of my angular brace members; Fig. 4 is a view, similar to Fig. 3, of the brace member when flat; Fig. 5 is a perspective view of the outer carton; and Fig. 6 is an end view of this carton, when flat and ready for shipment.

Referring to the figures, Fig. 5 shows the outside container or carton, preferably made of strawboard and creased along the edges;
it is rectangular in form, having the top 7, bottom 8, and sides 9 and 10, together with the end flaps 11, 12, 13, 14, 15 and 16, as shown, though other means for closing and securing the ends may be used. This carton is collapsible in the form shown in Fig. 6, by having the side members 9 and 10 flattened out so as to be mutually parallel with the top 7 and bottom 8, as shown in Fig. 6.

The inner egg-containing member is preferably built from paper pulp, and is pressed out substantially in the form shown in Fig. 1, having parallel rows of egg-spaces 17 and 18, elliptical in vertical cross-section, extending throughout the length of the carton, as shown in Fig. 2. The number of such rows of spaces 17 and 18 may be increased without departing from my invention. As shown in Fig. 1, this egg-containing member is preferably composed of a single strip of material having the semi-spherical pockets 19, 20, 21 and 22, which form the egg spaces 17 and 18 when the egg-containing member is bent over at 23, so as to bring together the two outer ends 24 and 25 in mutual parallelism as shown. The distance between the bend 23 which bears against the side 9, and the ends 24 and 25 which bear against the side 10, should be substantially equal to the interior width of the carton, as shown in Fig. 1, so that the egg-containing member may be held snugly in the carton, safe from jars or concussions against the two sides of the carton, this inner member forming a lateral brace. To avoid similar injurious jars from the top 7 and bottom 8, and further to hold the egg-containing member securely within the carton so that the pockets 19, 20, 21 and 22 may not come in contact with the top and bottom, I provide two angular bracing members, triangular in form as shown in Fig. 3. These bracing members are cut from strawboard or similar material, like the carton, the parts of which are integral, and may be shipped flat to the consumer, as shown in Fig. 4. Each bracing member comprises three parallel strips 26, 27 and 28 formed by creasing or scoring a single rectangular piece of strawboard. The side strips 27 and 28 are then bent inwardly as shown in Fig. 3, until they form with the base strip 26, a strong angular bracing member, substantially triangular in cross-section, as shown in Fig. 1. As shown in Figs. 1 and 2, the base strips 26 bear flatly against the top 7 and bottom 8, with the two side strips 27 and 28 converging to form the apices 29 and 30, of the upper and lower angular members respectively, which apices bear upon parallel portions of the egg-containing member intermediate the egg-spaces

17 and 18, as shown in Fig. 1. The side strips 27 and 28 bear slightly against the adjacent sides of the pockets 19, 20, 21 and 22, and the resulting X-shaped brace, so formed with the comparatively broad bearing of the base strips 26 upon the top and bottom of the carton, results in an exceedingly strong and effective protection for this inner egg containing member. The outer carton itself is strengthened against crushing along the weaker portions of the top, bottom and sides by the transverse interior strutting action of the angular bracing members acting upon the egg-containing member as shown.

To pack my improved carrier, the individual eggs are placed in the pockets 21 and 22, and the top pockets 19 and 20 are bent over and down upon the several eggs. Then the egg-containing member is inserted within the carton so that the bend 23, and the parallel ends 24 and 25 bear against their respective sides 9 and 10. After the egg-containing member has been shoved home within the carton, two angular bracing members are bent into the form shown in Fig. 3, and are slid into the carton intermediate the egg-spaces 17 and 18, so that their base strips 26 bear flatly against the top 7 and bottom 8 respectively, and their apices 29 and 30 bear against the egg-containing member as shown in Fig. 1. The end flaps 11, 12, 13, 14, 15 and 16 are then bent over to close the ends of the carton, as shown in Fig. 2, and are there secured by any convenient means. The egg-carrier is now ready for shipment.

Other modified arrangements of the parts comprising this carrier may be employed, adapted to the requirements of different sizes and shapes; also to the number of egg compartments utilized, as will readily occur to those familiar with this art.

I claim as my invention:—

1. An egg-carrier, comprising in combination, an exterior rectangular carton, an inner member within said carton, having parallel rows of egg-containing pockets, the lateral edges of said inner member bearing against the opposite sides of the carton, and a plurality of angular bracing members inserted between said parallel rows, bearing against the inner member, and also against the top and bottom of the carton.

2. An egg-carrier, comprising in combination, an exterior rectangular carton, an inner member within said carton, having parallel rows of egg-containing pockets, the lateral edges of said inner member bearing against the opposite sides of the carton, and a plurality of bracing members, triangular in cross-section, inserted between said parallel rows, bearing against the inner member, and also against the top and bottom of the carton.

3. An egg-carrier, comprising in combination, an exterior rectangular carton, an inner member within said carton, having parallel rows of egg-containing pockets, the lateral edges of said inner member bearing against the opposite sides of the carton, and a plurality of angular bracing members inserted between said parallel rows, bearing against the inner member intermediate said rows, and also against the top and bottom of the carton.

4. An egg-carrier, comprising in combination, an exterior rectangular carton, an inner member within said carton, having parallel rows of egg-containing pockets, the lateral edges of said inner member bearing against the opposite sides of the carton, and a plurality of bracing members, triangular in cross-section, inserted between said parallel rows, bearing against the inner member intermediate said rows, and also against the top and bottom of the carton.

5. An egg-carrier, comprising in combination, an exterior rectangular carton, an inner member within said carton, having parallel rows of egg-containing pockets, the lateral edges of said inner member bearing against the opposite sides of the carton, and a plurality of angular bracing members inserted between said parallel rows, bearing against the inner member intermediate said rows, against said pockets, and also against the top and bottom of the carton.

6. An egg-carrier, comprising in combination, an exterior rectangular carton, an inner member within said carton, having parallel rows of egg-containing pockets, the lateral edges of said inner member bearing against the opposite sides of the carton, and a plurality of bracing members, triangular in cross-section, inserted between said parallel rows, bearing against the inner member intermediate said rows, against said pockets, and also against the top and bottom of the carton.

WILLIAM D. TICKNOR.

Witnesses:
PHILIP C. PECK,
W. C. MANGNER.